United States Patent
Ukon et al.

(10) Patent No.: US 6,288,136 B1
(45) Date of Patent: Sep. 11, 2001

(54) RADIATION CURABLE RESIN COMPOSITION FOR CAST POLYMERIZATION

(75) Inventors: Masakatsu Ukon, Tsukuba; Toshihiko Takahashi, Tsuchiura; Takashi Ukachi, Ushiku, all of (JP)

(73) Assignees: DSM N.V., Heerlen (NL); JSR Corporation; Japan Fine Coatings, Ltd., both of Tokyo (JP)

( * ) Notice: Subject to any disclaimer, the term of this patent is extended or adjusted under 35 U.S.C. 154(b) by 0 days.

(21) Appl. No.: 09/502,228

(22) Filed: Feb. 11, 2000

Related U.S. Application Data

(63) Continuation of application No. PCT/NL98/00458, filed on Aug. 11, 1998.

(30) Foreign Application Priority Data

Aug. 12, 1997 (JP) .................................................... 9-230318

(51) Int. Cl.$^7$ ...................................................... C08F 2/48
(52) U.S. Cl. .................... 522/100; 522/172; 522/181; 522/182; 522/103; 427/508; 427/516; 427/517; 428/413
(58) Field of Search ................................... 522/100, 172, 522/181, 182, 103; 427/508, 516, 517; 428/413

(56) References Cited

U.S. PATENT DOCUMENTS

| | | |
|---|---|---|
| 4,719,131 | 1/1988 | Kemmerer et al. . |
| 4,745,003 | 5/1988 | Sirkoch et al. . |
| 4,985,472 | 1/1991 | Aosai et al. . |
| 5,880,171 | 3/1999 | Lim et al. . |
| 5,908,873 | 6/1999 | Shustack . |

FOREIGN PATENT DOCUMENTS

| | | |
|---|---|---|
| 0 313 665 | 5/1989 | (EP) . |
| 0 402 932 | 12/1990 | (EP) . |
| 0402932 A1 | 12/1990 | (EP) . |
| 93/21010 | 10/1993 | (WO) . |
| 99/06888 | * 11/1999 | (WO) . |

OTHER PUBLICATIONS

Japio Abstract of JP–02–258814; Publication date: Oct. 1990; Inventors: Mika et al.

Byron K. Christmas and Ed G. Zey, UV–curable monomer comparison, I: Cured Film Properties of Oligomer/Monomer Blends; Radcure '86 Conference Proceedings; Sep. 8–11, 1986; pp. 14/53–14/69, Baltimore, Maryland.

Anthony M. Sherman, "Balancing Formulation Storage Stability and Cure Behavior Thorugh the Use of Photoinitiator Blends"; Radcure '86 Conference Proceedings; Sep. 8–11, 1986; pp. 4/13–4/25, Baltimore, Maryland.

Byron K. Christmas and G. Zey: "UV–curable monomer comparison, I: cured film properties of oligomer/monomer blends," 1986, RADCURE '86 Conference Proceedings, Sep. 8–11, 1986, pp. 14,53–14/69, Baltimore, Maryland, US XP002085166 see the whole paper, the following section in particular: abstract, experimental, results and discussion under "difunctional monomers", tables 5 and 6.

Anthony M. Sherman: "Balancing formulation storage stability and cure behaviour throughteh use of photoinitiator blends" 1986, RADCURE '86 Conference Proceedings, Sep. 8–11, 1986, pp. 4/13–4/25, Baltimore, Maryland, US XP002085167 see abstract and experimental section.

Patent Abstracts of Japan vol. 015, No. 007, Jan. 9, 1991 & JP 02 258814 A (New Japan Chem. Co. Ltd.), Oct. 19, 1990 see abstract.

* cited by examiner

Primary Examiner—James J. Seidleck
Assistant Examiner—Sanza L. McClendon
(74) Attorney, Agent, or Firm—Pillsbury Winthrop LLP

(57) ABSTRACT

A radiation curable resin composition capable of producing molded articles which have excellent transparency, small light-coloring resistance, high dimensional accuracy, high surface hardness, and high thermal resistance. The radiation curable resin composition for cast polymerization, comprises (A) a (meth)acryloyl group-containing compound represented by the following general formula (1):

(1)

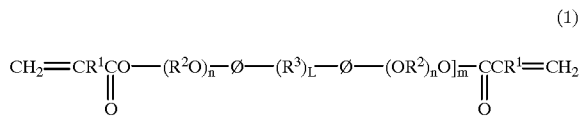

wherein $R^1$ represents a hydrogen atom or a methyl group, $R^2$ represents an alkylene group or a hydroxyalkylene group having 2–6 carbon atoms, $R^3$ represents a divalent organic group, n denotes an integer from 0 to 6, m denotes an integer from 1 to 10, and L denotes an integer from 0 or 1; (B) a (meth)acryloyl group-containing compound represented by the following general formula (2):

(2)

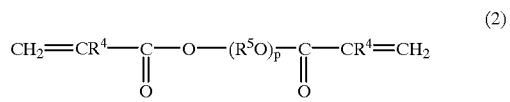

wherein $R^4$ represents a hydrogen atom or a methyl group, $R^5$ represents an alkylene group having 2-6 carbon atoms, and p denotes an integer from 1 to 16; and (C) a radiation active initiator possessing a specific molar absorption coefficient, respectively in a specific amount.

10 Claims, No Drawings

RADIATION CURABLE RESIN COMPOSITION FOR CAST POLYMERIZATION

This is a Continuation of International Application. No. PCT/NL98/00458 filed Aug. 11, 1998 which designated the U.S.

FIELD OF THE INVENTION

The present invention relates to a radiation curable resin composition which can be rapidly cured by radiation exposure, and, especially to a radiation curable resin composition for cast polymerization which is suitable not only for molded articles used for manufacturing optical parts such as lenses, optical disks, prisms, glass sheets, and the like, but also for surface coating materials which are applied to plastic film substrate materials used as optical materials such as substrates for liquid crystal display devices and the like.

DESCRIPTION OF RELATED ART

There are methods proposed for manufacturing plastic lenses or the like by irradiating a radiation curable resin composition with UV-rays from a mercury lamp as activated energy rays (see Japanese Patent Applications Laid-open No. 194401/1986 and No. 207632/1989). These methods have an advantage whereby the resin composition can be cured in a short period of time by irradiation with UV-rays. However, the transparency and hue of lenses produced by curing using UV-ray radiation are inferior to those of polymers such as polymethyl methacrylate, polycarbonate, diethylene glycol bisaryl carbonate, or the like. Also, there is a problem of coloring by ultraviolet radiation exposure and the like after molding. In addition, in a cast molding process for a UV-ray curable resin, a curing stress at the time of curing tends to remain in a molded article, which causes camber deformation and shrinkage, leading to a reduction in dimensional accuracy.

Radiation curable compositions for cast polymerization are known from EP-A-313665 and WO-A-9321010. These applications disclose compositions based on an acrylate oligomer (resp. an urethane (meth)acrylate oligomer and an epoxy (meth)acrylate oligomer), an acrylate monomer and a photoinitiator.

Epoxy (meth)acrrlate oligomers having a (poly)alkylene oxide terminated aromatic backbone are disclosed in EP-A-780712. These oligomers are used in peelable coating/matrix materials for optical fibers.

Japanese Patent Application Laid-open No. 174910/1995 discloses a prism sheet used to improve the frontal brightness of a back light unit used in a liquid crystal display apparatus. As a method for manufacturing this prism sheet, which is a molded article molded into a specific form using a transparent material with a specific refractive index, a monobloc molding method using transparent glass with a refractive index of a specific range and a method of forming a prism-shaped article using a UV-ray curable resin composition are disclosed. Furthermore, an active ray curable resin composition for cast polymerization, which is depth curable and is featured by a small optical strain in the cured product, is disclosed in Japanese Patent Application Laid-open No. 65111/1989.

Plastic materials represented by these UV-ray curable resins, however, are limited in use in the fields which require a thermal resistance as described in the above Patent Application Laid-open No. 65111/1989. Specifically, such a plastic material has a fatal drawback that, when a lens sheet represented by a prism sheet obtained using the conventional UV-ray curable resin is allowed to stand at a high temperature, a part of the lens sheet fuses and erodes to leave an adhesion scar on the surface of the back light, exerting an adverse influence on the optical properties.

Especially in cast polymerization, because a resin composition is polymerized by the radioactive rays transmitted from a mold made of glass or the like and from materials such as a plastic film or the like, the bulk of the rays of a short wave length is absorbed by shielding materials. The resin composition cannot acquire sufficient energy (absorption energy) to cure itself, whereby not only the curability and productivity are reduced, but also unreacted substances remain in the cured product, resulting in reductions in surface hardness and thermal resistance, which are fatal problems.

PROBLEMS TO BE SOLVED BY THE INVENTION

The present invention has been undertaken to solve the above conventional problems and has an object to provide a radiation curable resin composition which has excellent transparency, small light-coloring resistance, high dimensional accuracy, excellent curability, high surface hardness, and high thermal resistance so that it can produce at high yield molded articles, which never stick to or erode an adjacent substrate or the like in a high temperature condition.

MEANS FOR THE SOLUTION OF THE PROBLEMS

The present inventors have conducted earnest studies in view of this situation, and, as a result, discovered the following radiation curable resin composition to complete the present invention.

Accordingly, the present invention provides a radiation curable resin composition for cast polymerization, comprising:

(A) 20–94.9% by weight of a (meth)acryloyl group-containing compound (hereinafter called "component (A)") represented by the following general formula (1):

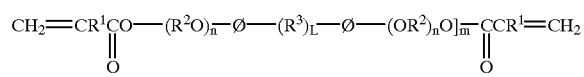

(1)

wherein $R^1$ represents a hydrogen atom or a methyl group, $R^2$ represents an alkylene group or a hydroxyalkylene group having 2–6 carbon atoms, $R^3$ represents a divalent organic group, n denotes an integer from 0 to 6, m denotes an integer from 1 to 10, and L denotes an integer from 0 or 1;

(B) 5–79.9% by weight of a (meth)acryloyl group-containing compound (hereinafter called "component (B)") represented by the following general formula (2):

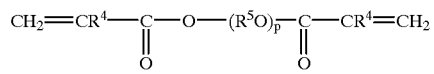

(2)

wherein $R^4$ represents a hydrogen atom or a methyl group, $R^5$ represents an alkylene group having 2–6 carbon atoms, and p denotes an integer from 1 to 16; and (C) 0.1 to 10% by weight of a radiation active initiator (hereinafter called "component (C)") having molar absorption coefficients of 100 L·mol$^{-1}$·cm$^{-1}$ or more at a wave length of 360 nm and of 100 L·mol$^{-1}$cm$^{-1}$ or less at a wave length of 450 nm.

The present invention will now be explained in detail by way of an embodiment.

In (meth)acryloyl group-containing compounds used as component (A) of the present invention, as the alkylene group or the hydroxyalkylene group having 2–6 carbon atoms, which is represented by R$^2$ in the above formula (1), divalent organic groups represented by the following formulae (3-1) to (3-11) are exemplified:

  (3-1)

  (3-2)

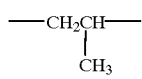  (3-3)

  (3-4)

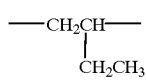  (3-5)

  (3-6)

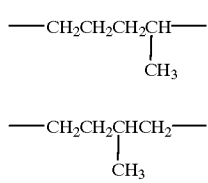  (3-7)

(3-8)

  (3-8)

(3-10)

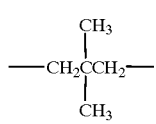

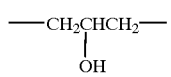  (3-11)

Among these, the organic groups represented by formulae (3-1), (3-3), and (3-11) are preferred.

In addition, as preferable organic groups represented by R$^3$ when L is 1 in the above general formula (1), organic groups represented by the following formulae (4-1) to (4-7) are exemplified:

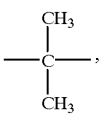  (4-1)

  (4-2)

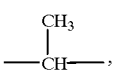  (4-3)

  (4-4)

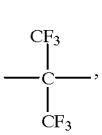  (4-5)

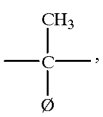  (4-6)

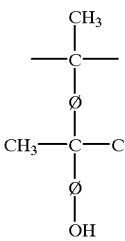  (4-7)

Among these, the organic groups represented by formula (4-1) are particularly preferable. Also, compounds having a structural formula in which hydrogens of optional aromatic rings in general formula (1) are substituted with a bromine atom and a chlorine atom may be used.

Specific examples of the compounds represented by formula (1) include ethylene oxide addition bisphenol A (meth) acrylate, propylene oxide addition bisphenol A (meth) acrylate, bisphenol A diglycidyl ether epoxy acrylate prepared by an epoxy ring-opening reaction of bisphenol A diglycidyl ether and (meth)acrylic acid, bisphenol F diglycidyl ether epoxy acrylate prepared by an epoxy ring-opening reaction of bisphenol F diglycidyl ether and (meth) acrylic acid, and the like.

These compounds are commercially available under the trademarks, for example, of Viscoat 700, 540 (manufactured by Osaka Organic Chemical Industry Co., Ltd.), Aronix M-210 (manufactured by Toagosei Co., Ltd.), NK Ester BPE-100, BPE-200, BPE-500, A-BPE-4 (manufactured by Shin-Nakamura Chemical Co., Ltd.), Light Ester BP-4EA, BP-4PA, BP-2PA, BP-2EA, Epoxy Ester 3002M, 3002A, 3000M, 3000A (manufactured by Kyoeisha Chemical Co., Ltd.), KAYARAD R-551, R-712 (manufactured by Nippon Kayaku Co., Ltd.), BPE-4, BPE-10, BR-42M (manufactured by Daiichi Kogyo Seiyaku Co., Ltd.), Lipoxy VR-77, VR-60, VR-90, SP-1506, SP-1507, SP-1509, SP-1563 (manufactured by Showa High polymer Co., Ltd.).

The proportion of component (A) in the composition is generally from 20 to 94.9% by weight and preferably from 30 to 70% by weight. When the proportion of component (A) is within the above defined range, the cured product has an appropriate refractive index and exhibits excellent surface hardness. If the proportion is less than 20% by weight, only cured products having a reduced refractive index and a poor surface hardness are obtained. On the other hand, if the proportion exceeds 94.9% by weight, only cured products which greatly shrink in the curing process and have a lower dimensional accuracy are obtained.

In (meth)acryloyl group-containing compounds used as the component (B) of the present invention, as the alkylene group having 2–6 carbon atoms, which is represented by $R^s$ in the above formula (2), divalent organic groups represented by the following formulae (5-1) to (5-10) are exemplified:

$$-CH_2CH_2- \quad (5\text{-}1)$$

$$-CH_2CH_2CH_2- \quad (5\text{-}2)$$

$$-CH_2CH- \atop CH_3 \quad (5\text{-}3)$$

$$-CH_2CH_2CH_2CH_2- \quad (5\text{-}4)$$

$$-CH_2CH- \atop CH_2CH_3 \quad (5\text{-}5)$$

$$-CH_2CH_2CH_2CH_2CH_2- \quad (5\text{-}6)$$

$$-CH_2CH_2CH_2CH- \atop CH_3 \quad (5\text{-}7)$$

$$-CH_2CH_2CHCH_2- \atop CH_3 \quad (5\text{-}8)$$

$$-CH_2CH_2CH_2CH_2CH_2CH_2- \quad (5\text{-}9)$$

$$-CH_2CCH_2- \atop {CH_3 \atop CH_3}^{CH_3} \quad (5\text{-}10)$$

Among these, the organic groups represented by formulae (5-1), (5-3), and (5-10) are preferred.

Given as specific examples of the compounds represented by formula (2) are ethylene glycol diacrylate, diethylene glycol diacrylate, triethylene glycol diacrylate, tetraethylene glycol diacrylate, polyethylene glycol diacrylate, 1,6-hexanediol diacrylate, neopentyl glycol diacrylate, 1,3 butylene glycol diacrylate, dipropylene glycol diacrylate, tripropylene glycol diacrylate, polypropylene glycol diacrylate, polytetramethylene glycol diacrylate, and the like.

Among these compounds, tetraethylene glycol diacrylate, and tripropylene glycol diacrylate are especially desirable.

These compounds are commercially available under the trademarks, for example, of Viscoat 195, 230, 260, 215, 335, 310 (manufactured by Osaka Organic Chemical Industry Co., Ltd.), Aronix M-220, M-240, M-245 (manufactured by Toagosei Co., Ltd.), NK Ester A-200, A-400, A-600, A-HD, A-NPG, APG-200, APG-400, APG-700 (manufactured by Shin-Nakamura Chemical Co., Ltd.), Light Ester 3EG-A, 4EG-A, 9EG-A, 14EG-A, NP-A, 1 E6HX-A (manufactured by Kyoeisha Chemical Co., Ltd.), KAYARAD HDDA, NPGDA, TPGDA, PEG400DA, SR-268, SR-2000A, SR-205 (manufactured by Nippon Kayaku Co., Ltd.), PE-200, PE-300, PE-400, PE-600, EP-22, HDDA, (manufactured by Daiichi Kogyo Seiyaku Co., Ltd.) and the like.

The proportion of the component (B) in the composition is generally from 5 to 79.9% by weight and preferably from 10 to 40% by weight. When the proportion is within the above defined range, a cured product, which has an appropriate hardness and is superior in dimensional accuracy, long-term durability, and thermal resistance, can be obtained. If the proportion is less than 5% by weight, the hardness of the cured product decreases to cause the cured product to adhere to a substrate, whereas if the proportion exceeds 79.9% by weight, only a cured product which shrinks greatly at the time of curing and is inferior in dimensional accuracy is obtained.

The composition of the present invention may include a copolymerizable monomer (hereinafter called "component (X)") other than the components (A) and (B). This copolymerizable monomer may be either a monofunctional monomer or a polyfunctional monomer. Examples of the monofunctional monomer include vinyl group-containing monomers such as N-vinyl caprolactam, N-vinyl pyrrolidone, N-vinylcarbazole, vinyl pyridine, and the like; amides such as acrylamide, isobutoxymethyl (meth) acrylamide, t-octyl (meth)acrylamide, diacetone (meth) acrylamide, N,N-dimethyl (meth)acrylamide, and the like; (meth)acrylates such as 7-amino-3,7-dimethyloctyl (meth) acrylate, isobornyloxyethyl (meth)acrylate, isobornyl (meth)acrylate, 2-ethylhexyl (meth)acrylate, ethyldiethylene glycol (meth)acrylate, dimethylaminoethyl (meth)acrylate, diethylaminoethyl (meth)acrylate, lauryl (meth)acrylate, dicyclopentadiene (meth)acrylate, dicyclopentenyloxyethyl (meth)acrylate, dicyclopentenyl (meth)acrylate, 2-tetrachlorophenoxyethyl (meth)acrylate, tetrachlorophenyl (meth)acrylate, tetrahydrofurfuryl (meth)acrylate, tetrabromophenyl (meth)acrylate, 2-tetrabromophenoxyethyl (meth)acrylate, 2-trichlorophenoxyethyl (meth)acrylate, tribromophenyl (meth)acrylate, 2-tribromophenoxyethyl (meth)acrylate, 2-hydroxyethyl (meth)acrylate, 2-hydroxypropyl (meth)acrylate, phenoxyethyl (meth) acrylate, butoxyethyl (meth)acrylate (meth)acrylate, pentachlorophenyl (meth)acrylate, pentabromophenyl (meth) acrylate, polyethylene glycol mono(meth)acrylate, polypropylene glycol mono(meth)acrylate, bornyl (meth) acrylate, methyltriethylene diglycol (meth)acrylate, and the like; and (meth)acryloyl group containing monomers such as acryloyl morpholine, compounds represented by the following formulae (6)–(8), and the like:

$$CH_2\!=\!\!\underset{R^6}{\overset{}{C}}\!-\!\underset{O}{\overset{}{C}}\!-\!O\!-\!(R^7O)_{\overline{q}}\!-\!\varnothing\!-\!R_8 \quad (6)$$

-continued

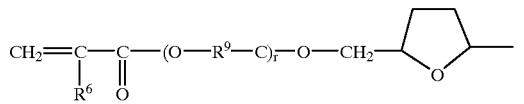
(7)

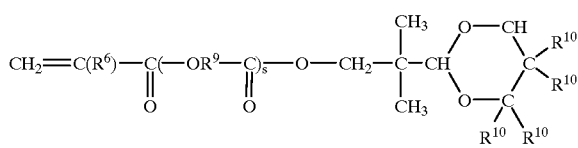
(8)

wherein $R^6$ represents a hydrogen atom and a methyl group, $R^7$ represents an alkylene group having 2–6, preferably 2–4, carbon atoms, $R^8$ represents a hydrogen atom or an alkyl group having 1–12, preferably 1–9, carbon atoms, $R^9$ represents an alkylene group having 2–8, preferably 2–5, carbon atoms, $R^{10}$ represents a hydrogen atom or a methyl group, q denotes an integer from 0 to 12, and preferably from 1 to 8, r denotes an integer from 1 to 8, and preferably from 1 to 4, and s denotes an integer from 1 to 8 and preferably from 1 to 4.

Among these compounds, N-vinyl caprolactam, N-vinyl pyrrolidone, acryloyl morpholine, N-vinylcarbazole, isobornyl (meth)acrylate, phenoxyethyl (meth)acrylate and the like are desirable and N-vinyl caprolactam, N-vinyl pyrrolidone, acryloyl morpholine, and phenoxyethyl (meth) acrylate are especially desirable.

Examples of commercially available compounds of the monofunctional monomer used as the component (X) include Aronix M-111, M-113, M-117 (manufactured by Toagosei Co., Ltd.), KAYARAD TC110S, R-629, R-644 (manufactured by Nippon Kayaku Co., Ltd.), and Viscoat 3700 (manufactured by Osaka Organic Chemical Industry Co., Ltd.).

Given as examples of the polyfunctional monomer are monomers containing a plurality of (meth)acryloyl groups such as dicyclopentenyl di(meth)acrylate, tricyclodecanediyldimethylene di(meth)acrylate, trimethylolpropane tri(meth)acrylate, trimethylolpropane trioxyethyl (meth) acrylate, pentaerythritol tri(meth)acrylate, pentaerythritol tetra(meth)acrylate, polyester di(meth)acrylate, and the like. Among these compounds, tricyclodecanediyldimethylene di(meth)acrylate is desirable.

As commercially available compounds of the polyfunctional monomer used as the component (X), for example, Yupimer UV, SA1002 (manufactured by Mitsubishi Chemical Corp.), KAYARAD R-604, DPCA-60, DPCA-30, DPCA-120, HX-620, D-310, D-330 (manufactured by Nippon Kayaku Co., Ltd.), Aronix M-215 (manufactured by Toagosei Co., Ltd.), or the like can be used.

The copolymers of the component (X) may be used either singly or in combinations of two or more.

The proportion of the component (X) in the composition is from 0 to 60% by weight and preferably from 0 to 40% by weight.

The radiation active initiator used as the component (C) of the present invention is characterized in that the molar absorption coefficient is 100 $L \cdot mol^{-1} \cdot cm^{-1}$ or more at a wave length of 360 nm and 100 $L \cdot mol^{-1} \cdot cm^{-1}$ or less at a wave length of 450 nm.

Here, the above molar absorption coefficient is defined as one which is calculated according to the following formula, for which the absorbance of a methanol solution containing 0.5 to 3 mmol/L of the target compound is measured at 25° C. using an absorptiometer:

Molar absorption coefficient ($L \cdot mol^{-1} \cdot cm^{-1}$) =Absorbance/{Solution density (mol$\cdot L^{-1}$)$\cdot$Optical path (cm)}

The molar absorption coefficient of the component (C) is as high as 100 $L \cdot mol^{-1} \cdot cm^{-1}$ or more even at a wave length of 360 nm which is out of the range of the wave length absorbed by the mold and substrate materials used in cast polymerization. The resin composition, therefore, can absorb sufficient energy to polymerize, whereby unreacted substances in the resulting cured product decrease, hence molded articles possessing excellent thermal resistance can be produced.

If the molar absorption coefficient of the radiation active initiator at a wave length of 360 nm is not higher than 100 $L \cdot mol^{-1} \cdot cm^{-1}$, the resin composition cannot acquire sufficient energy to polymerize. On the other hand, if the molar absorption coefficient of the radiation active initiator at a wave length of 450 nm exceeds 100 $L \cdot mol^{-1} \cdot cm^{-1}$, the coloring of the resulting cured product increases, causing optical properties to be damaged, especially when optical products are molded.

Specific examples of the above component (C) include 2,2-dimethoxy-2-phenylacetophenone, 2-methyl-1-4-[(methylthio)phenyl]-2-morphorinopropan-l-on, 2,4,6-trimethylbenzoyl diphenylphosphine oxide, 2,4,6-trimethylbenzoyl ethoxyphenylphosphine oxide, 2,4,6-trimethylbenzoyl diethoxyphosphine oxide, and bis-(2,6-dimethoxybenzoyl)-2,4,4-trimethylpentylphosphine oxide.

Among these, bis(2,6-dimethoxybenzoyl)-2, 4,4-trimethylpentylphosphine oxide, 2,4,6-trimethylbenzoyl diphenylphosphine oxide, and 2,4,6-trimethylbenzoyl ethoxyphenylphosphine oxide are preferable and bis(2,6-dimethoxybenzoyl)-2,4,4-trimethylpentylphosphine oxide and 2,4,6-trimethylbenzoyl ethoxyphenylphosphine oxide are particularly preferable. Examples of commercially available products of these compounds include Irgacure 651, 907, 369, CGI1700, 1750, 1850 (manufactured by Ciba-Geigy) and Lucirin TPO, LR8893 (manufactured by BASF).

Radiation active initiators such as UV-ray polymerization initiator and the like other than component (C) and photosensitizers may be also used to the extent that an effect of the present invention is not impaired. Given as examples of the radiation active initiator are acetophenone, acetophenone benzyl ketal, anthraquinone, 1-hydroxycyclohexyl phenyl ketone, xanthone type compounds, triphenylamine, carbazole, 3-methylacetophenone, 4-chlorobenzophenone, 4,4'-dimethoxybenzophenone, 4,4'-diaminobenzophenone, 2-hydroxy-2-methyl-1-phenylpropan-1-one, 1-(4-isopropylphenyl)-2-hydroxy-2-methylpropan-1-one, 1,1-dimethoxydeoxybenzoin, 3,3'-dimethyl-4-methoxybenzophenone, thioxanthone type compounds, diethylthioxanthone, 2-isopropylthioxanthone, 2-chlorothioxanthone, 1-(4-dodecylphenyl)-2-hydroxy-2-methylpropan-1-one, triphenylamine, fluorenone, fluorene, benzaldehyde, benzoin ethyl ether, benzoin propyl ether, benzophenone, Michler's ketone, 2-benzyl-2-dimethylamino-1-(4-morpholinophenyl)butan-1-one, 3-methylacetophenone, and 3,3',4,4'-tetra(t-butyl peroxycarbonyl) benzophenone (BTTB), and further com binations of BTTB and a coloring substance photosensitizer such as xanthene, thioxanthene, cumarin, ketocumarin or the like. Moreover, the compounds which are represented by the following formula (9) can be used.

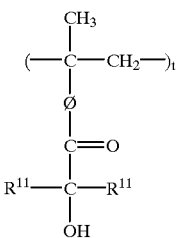

(9)

wherein $R^{11}$s independently represent an alkyl group having 1–5 and preferably 1–3 carbon atoms and t denotes an integer from 2 to 50 and preferably from 2 to 20.

Among these compounds, 2-hydroxy-2-methyl-1-phenylpropan-1-one and 1-hydroxycyclohexyl phenyl ketone are desirably used.

Examples of commercially available products of these radiation active initiators include Darocure 1173 (manufactured by Merck Co.) and Irgacure 184 (manufactured by Ciba-Geigy).

Examples of compounds usable as the photosensitizer include triethylamine, diethylamine, N-methyldiethanoleamine, ethanolamine, 4-dimethylaminobenzoic acid, methyl 4-dimethylaminobenzoate, ethyl 4-dimethylaminobenzoate, isoamyl 4-dimethylaminobenzoate and commercially available products such as Ubecryl P102, 103, 104, 105 (manufactured by UCB Co.).

The proportion of the radiation active initiator, which is the component (C), is generally from 0.1 to 10% by weight and preferably from 0.1 to 5% by weight of the total amount of the composition. The proportion exceeding 10% by weight sometimes has an adverse effect on the storage stability of the composition and the properties and appearance of the cured product. On the other hand, if the proportion is not more than 0.1% by weight, there is the case where the curing rate decreases.

Various additives may be added to the composition of the present invention as required. Given as typical examples of these additives are antioxidants, UV absorbers, light stabilizers, silane coupling agents, aging preventives, thermal polymerization inhibitors, colorants, leveling agents, surfactants, preservatives, plasticizers, lubricants, solvents, inorganic type fillers, organic type fillers, fillers, wettability improvers, coating surface improvers, and the like.

Examples of commercially available products used as antioxidants include Irganox 1010, 1035, 1076, 1222 (manufactured by Ciba-Geigy) and the like. Examples of commercially available products used as UV absorbers include Tinuvin P, 234, 320, 326, 327, 328, 213, 400 (manufactured by CIA-Geigy), Sumisorb 110, 130, 140, 220, 250, 300, 320, 340, 350, 400 (manufactured by Sumitomo Chemical Industries Co., Ltd.), and the like.

Examples of commercially available products of light stabilizers include Tinuvin 292, 144, 622LD (manufactured by Ciba-Geigy), Sanol LS-770, 765, 292, 2626, 1114, 744 (manufactured by Sankyo Chemical Co.), and the like.

Examples of compounds used as silane coupling agents include γ-aminopropyl-triethoxysilane, γ-mercaptopropyl-trimethoxysilane, γ-methacryloxy-propyltrimethoxysilane, and commercially available products such as SH6062, SZ6030 (manufactured by Toray-Dow Corning Silicone Co.), KBE903, KBM803 (manufactured by Shin-Etsu Silicone Co., Ltd.), and the like.

Examples of commercially available products of aging preventives include Antigene W, S, P, 3C, 6C, RD-G, FR, AW (manufactured by Sumitomo Chemical Industries Co., Ltd.) and the like.

The composition of the present invention may comprise polymers, oligomers, or monomers to the extent that the effect of the present invention is not impaired. Examples of these polymer, oligomer, or monomers include epoxy resin, urethane (meth)acrylate, vinyl ether, propenyl ether, maleic acid derivatives, polyamide, polyimide, polyamideimide, polyurethane, polybutadiene, chloroprene, polyether, polyester, pentadiene derivatives, styrene/butadiene/styrene block copolymer, styrene/ethylene/butene/styrene block copolymer, styrene/isoprene/styrene block copolymer, petroleum resin, xylene resin, ketone resin, fluorine-containing oligomer, silicon-containing oligomer, and polysulfide type oligomer.

The radiation curable resin composition can be prepared by mixing the aforementioned components according to a general method. The viscosity of the composition of the present invention prepared in this manner is generally from 100 to 20,000 cps, preferably from 500 to 10,000 cps, at 25° C.

The radiation curable resin composition of the present invention is cured to produce a cured product with the modulus of elasticity in tension at 23° C. being 10–250 kg/mm². Also, the refractive index nD25 (refractive index of sodium D rays at 25° C.) of the cured product is 1.53 or more and preferably 1.55 or more. Moreover the curing shrinkage rate associated with curing is 10% or less, preferably 8% or less, and more preferably 6% or less. Preferably, the product has a pencil hardness of H or higher. Incidentally, the radiation in the present invention includes ultraviolet radiation, visible rays, infrared radiation, α-rays, β-rays, γ-rays, and X-rays.

EXAMPLES

The present invention will be explained in more detail by way of examples, which are not intended to be limiting of the present invention.

Examples 1–3 and Comparative Examples 1–3

The components of each of the compositions shown in Table 1 were placed in a reaction vessel equipped with a stirrer and stirred for three hours while controlling the temperature at 50 to 60° C. Using these resin compositions which were uniformly stirred in this manner, the properties were measured. Each value for Examples 1–3 and Comparative Examples 1–3 in Table 1 is expressed as that of a percent by weight.

TABLE 1

| Component | Example | | | Comp. Example | | |
|---|---|---|---|---|---|---|
| | 1 | 2 | 3 | 1 | 2 | 3 |
| A1 | 58 | — | 58 | 58 | — | 58 |
| A2 | — | 58 | — | — | — | — |
| B1 | 24 | 24 | — | — | 58 | 24 |
| B2 | — | — | 24 | — | — | — |
| X1 | 10 | 10 | — | 29 | — | 10 |
| X2 | — | — | 10 | — | 29 | — |
| X3 | 5 | 5 | — | 10 | 10 | 5 |

TABLE 1-continued

|  | Example | | | Comp. Example | | |
|---|---|---|---|---|---|---|
| Component | 1 | 2 | 3 | 1 | 2 | 3 |
| C1 | 1.5 | — | 1.5 | 1.5 | 1.5 | — |
| C2 | — | 2 | — | — | — | — |
| Y1 | 1.5 | — | 1.5 | 1.5 | 1.5 | 6 |

A1: bisphenol A diglycidyl ether epoxy acrylate;
A2: ethylene oxide addition bisphenol A acrylate;
B1: tripropylene glycol diacrylate;
B2: tetra ethylene glycol diacrylate;
X1: phenoxyethyl acrylate;
X2: tricyclodecanediyldimethylene diacrylate;
X3: acryloylmorpholine;
X4: N-vinyl caprolactam;
C1: bis-(2,6-dimethoxybenzoyl)-2,4,4-trimethylpentyl phosphine oxide (molar absorption coefficient is 800 $L \cdot mol^{-1} \cdot cm^{-1}$ at a wave length of 360 nm and not more than 10 $L \cdot mol^{-1} \cdot cm^{-1}$ at a wave length of 450 nm);
C2: 2,4,6-trimethylbenzoyl diphenylphosphine oxide (the molar absorption coefficient is 320 $L \cdot mol^{-1} \cdot cm^{-1}$ at a wave length of 360 nm and not more than 10 $L \cdot mol^{-1} \cdot cm^{-1}$ at a wave length of 450 nm);
Y1: 1-hydroxycyclohexyl phenylpropanone (molar absorption coefficient is 40 $L \cdot mol^{-1} \cdot cm^{-1}$ at a wave length of 360 nm and not more than 10 $L \cdot mol^{-1} \cdot cm^{-1}$ at a wave length of 450 nm);

Test Example

A test specimen was made by the following procedures using each of the resulting resin compositions prepared in the aforementioned Examples and Comparative Examples to evaluate the refractive index, pencil hardness, curing shrinkage rate, and substrate erosion over a long-term under high temperature storage. The results are shown in Table 2.

Production of test specimens:

Resin composition at a thickness of about 200 μm was applied to the surface of a glass plate using a 15 mil applicator bar and was irradiated with UV-rays at a dose of 1.0 J/cm² in air to obtain a cured film. The cured film was then peeled away from the glass plate and kept at 23° C. under a relative humidity of 50% for 24 hours to prepare a test specimen.

Refractive index:

The refractive index of the test specimen at 25° C. was measured using an Abbe refractometer.

Hardness:

The pencil hardness of the test specimen of the above resin composition was measured using a pencil scratch test machine under a load of 1 kg according to JIS K5400.

Curing shrinkage rate:

Resin composition at a thickness of about 100 μm was applied to the surface of a film of PET (polyethylene terephthalate) with a thickness of 120 μm using a 250 μm thickness applicator bar and was irradiated with UV-rays at a dose of 1.0 J/cm² in air. Four pieces which were each 10 by 10 cm were cut off the four corners of the test specimen and the warp rates of the four pieces were measured using a slide caliper and averaged. The curing shrinkage rate was evaluated by rating the average warp rate as "○", "Δ", and "X" when the average warp rate was not more than 10 mm, more than 10 mm and not more than 15 mm, and 15 mm or more respectively.

Transparency:

Resin composition at a thickness of about 100 mm was applied to the surface of a slide glass using a 250 mm thickness applicator bar and was irradiated with UV-rays at a dose of 1.0 J/cm² in air to obtain a cured film. The color difference (ΔE) of the test piece on which the cured film was formed was measured by a color-difference meter (SZ-Σ80/MSP, manufactured by Nippon Denshoku Co., Ltd.) using a slide glass on a standard white plate as a reference. The transparency was evaluated by rating the color difference (ΔE) as "○", "Δ", and "X" when the color difference (ΔE) was not more than 3, more than 3 and not more than 5, and 5 or more respectively.

Substrate erosion:

Resin composition was injected into a prism sheet mold having micro-irregularity. A transparent PET sheet with a thickness of 125 μm was allowed to adhere to the resin composition. Then UV-rays were applied to the side of the PET sheet at a dose of 1.0 J/cm² to prepare a cured film. The cured film was cut into strip specimens of 5 mm width and 50 mm length. Five strip specimens were arranged on a glass plate at intervals of 5 mm. An acryl plate with a thickness of 2 mm was placed on the strip specimens and the circumference of the acryl plate was sealed with adhesive tape in the condition that a load of 20 g/cm2 was applied to the acryl plate. This glass plate was kept in a thermostat at 100° C. for one hour and then removed. The load and the acryl plate on the glass plate were released to observe the portion of the acryl plate, which contacted the strip specimens, and thereby to confirm whether there were adhesive traces or not. The substrate erosion was evaluated by rating the observed results as "○" and "X" when the adhesive traces were unobserved and observed respectively.

TABLE 2

|  | Example | | | Comp. Example | | |
|---|---|---|---|---|---|---|
|  | 1 | 2 | 3 | 1 | 2 | 3 |
| Refractive index | 1.55 | 1.54 | 1.55 | 1.57 | 1.51 | 1.55 |
| Hardness | 2H | 2H | H | 2H | HB | H |
| Curing shrinkage rate | ○ | ○ | ○ | X | Δ | ○ |
| Transparency | ○ | ○ | ○ | ○ | ○ | ○ |
| Substrate erosion | ○ | ○ | ○ | X | X | X |

As shown in Table 2, the compositions of Examples 1 to 3 showed excellent results, exhibiting a high refractive index, high surface hardness, small curing shrinkage, high transparency, and reduced substrate erosion. On the other hand, the composition of Comparative Example 1 excluding component (B) contained in the composition of the present invention, exhibited a large curing shrinkage rate and increased substrate erosion. In addition, the composition of Comparative Example 2 excluding component (A) contained in the composition of the present invention, exhibited a slightly larger curing shrinkage rate. Also, substrate erosion was found in Comparative Example 2. Substrate erosion was also found in the composition of Comparative Example 3.

As is clear from the above explanations, the radiation curable resin composition of the present invention has excellent features in that it has excellent transparency, small light-coloring resistance, extremely small curing shrinkage in the curing step, superior curability, high surface hardness, and high thermal resistance, hence it can produce at high yield molded articles which have high dimensional accuracy and never adhere to or erode an adjacent substrate or the like at high temperatures. The composition of the present invention is, therefore, suitable for producing optical parts such as a lens, optical disk, prism, lens sheet, and the like. Also, it is suitable for use as a surface coating material for a plastic film substrate material used for an optical material such as a substrate for a liquid crystal display device. Also, it can be used as a coating material for wood, paper, plastics, metals, ceramics, and the like.

What is claimed is:

1. A radiation curable resin composition for cast polymerization, comprising:
   (A) 20–94.9% by weight of a (meth)acryloyl group-containing compound (hereinafter called "component (A)") represented by the following general formula:

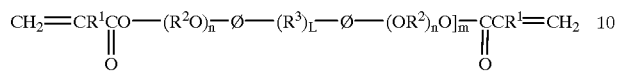

wherein $R^1$ represents a hydrogen atom or a methyl group, $R^2$ represents an alkylene group or a hydroxyalkylene group having 2–6 carbon atoms, $R^3$ represents a divalent organic group, n denotes an integer from 0 to 6, m denotes an integer from 1 to 10, and L denotes an integer from 0 or 1;
   (B) 5–79.9% by weight of a (meth)acryloyl group-containing compound (hereinafter called "component (B)") represented by the following general formula:

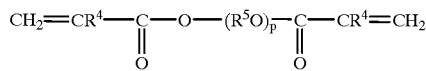

wherein $R^4$ represents a hydrogen atom or a methyl group, $R^5$ represents an alkylene group having 2–6 carbon atoms, and p denotes an integer from 1 to 16; and (C) 0.1 to 10% by weight of a radiation active initiator (hereinafter called "component (C)") having molar absorption coefficients of 100 $L \cdot mol^{-1} \cdot cm^{-1}$ or more at a wave length of 360 nm and of 100 $L \cdot mol^{-1} \cdot cm^{-1}$ or less at a wave length of 450 nm.

2. Resin composition according to claim 1, wherein the composition has a viscosity of 100–20,000 cps.

3. Resin composition according to any one of claims 1–2, wherein the composition upon cure exhibits a curing shrinkage of 10% or less.

4. A process for the production of an article by casting a radiation curable resin composition according to any one of claims 1–3, in a mold, and curing the resins with radiation.

5. Product obtained by the process of claim 4, having a refractive index of 1.53 or more.

6. Product according to claim 5 wherein the product has a modulus of elasticity in tension at 23° C. of 10–250 kg/mm².

7. Product according to any one of claims 5–6, wherein the product has a pencil hardness of H or higher.

8. Product according to any one of claims 5–7 wherein the product has a transparancy in ΔE of less than 3.

9. Product according to any one of claims 5–8, in the form of a lens, disk, prism or lens sheet.

10. Product according to any one of claims 5–8 in the form of a coating for a plastic film substrate for an optical material.

* * * * *